O. A. HEPPES.
MACHINE FOR MAKING ROOFING STRIPS.
APPLICATION FILED JULY 26, 1915.
1,290,555.
Patented Jan. 7, 1919.
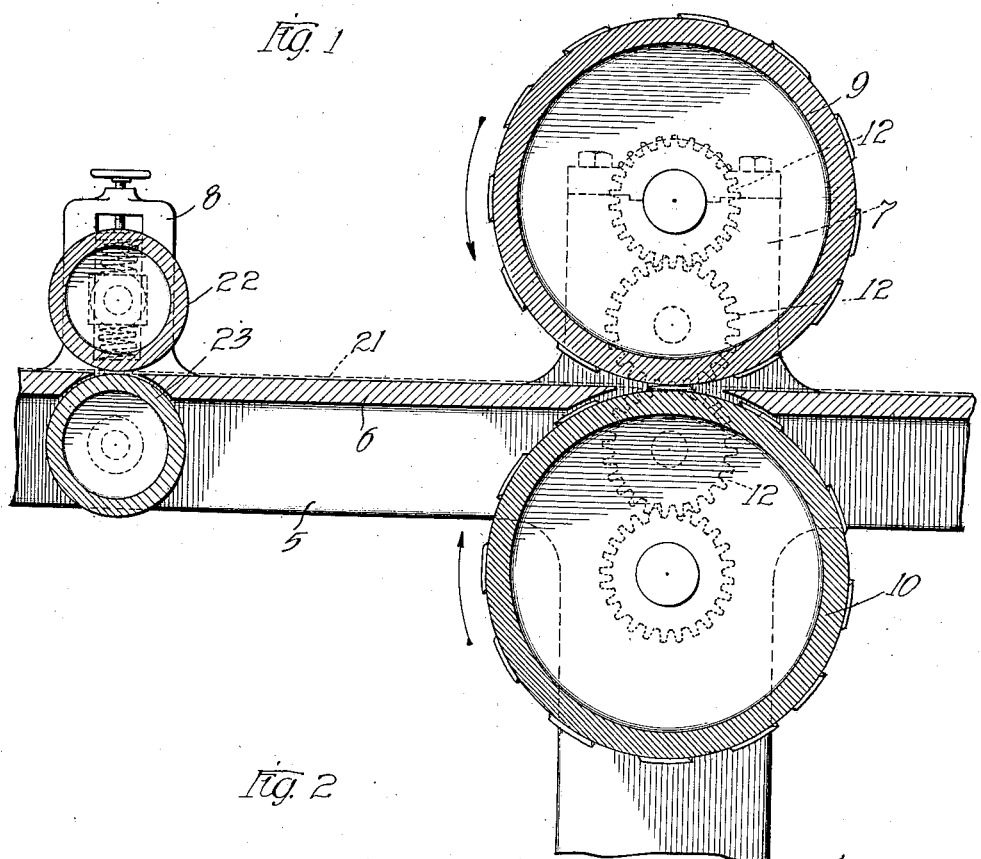
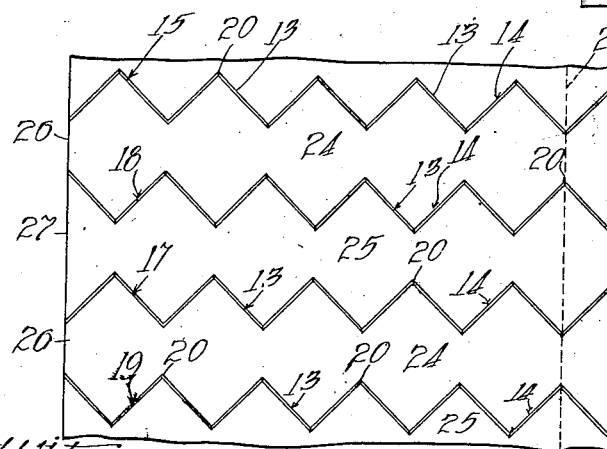
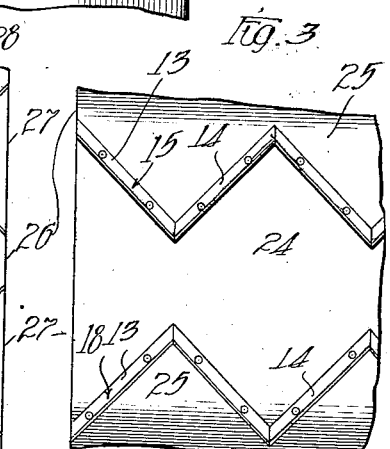
Witnesses:
Robert H. Weir
Arthur W. Carlson
Inventor
Otto A. Heppes
Jones Rain May
Attys.

UNITED STATES PATENT OFFICE.

OTTO A. HEPPES, OF LA GRANGE, ILLINOIS.

MACHINE FOR MAKING ROOFING-STRIPS.

1,290,555.      Specification of Letters Patent.      Patented Jan. 7, 1919.

Application filed July 26, 1915. Serial No. 41,926.

*To all whom it may concern:*

Be it known that I, OTTO A. HEPPES, a citizen of the United States, residing at La Grange, in the county of Cook and State of Illinois, have invented certain new and useful Improvements in Machines for Making Roofing-Strips, of which the following is a specification.

One of the objects of my invention is to provide an improved machine for making roofing strips which have dentated longitudinal edges, each edge of which comprises a preferably uniform series of projections and intermediate depressions, whereby to produce ornamental designs simulating the appearance of shingles, slate or tile when lapped and laid upon a roof.

Another object of my invention is to provide a machine that will shear such strips transversely from a continuous sheet of uniform width in which the configuration or uneven edges of a given strip are similar but having its component parts preferably longitudinally displaced, with reference to the individual members thereof, without laterally shifting the sheet or the shearing knives to provide proper relative displacement thereof, to produce the design.

Another object of my invention is to provide a machine having like rotary shearing knives but longitudinally displaced, alternating circumferentially upon either roll of a pair of coöperating rotatable rolls whereby to produce a strip having its longitudinal edges so related that the upper edge of one strip will register with the lower edge of the succeeding strip, the contiguous edges of the succeeding strip, the contiguous edges being sheared asunder so as to prevent waste of material, this effect being produced by the machine without the necessity of laterally shifting the sheet from which the strips may be sheared.

In a copending application, filed of even date herewith, I have disclosed and claimed the strips as made by the present machine.

Other and further objects of my invention will become readily apparent, to persons skilled in the art, from a consideration of the following description when taken in conjunction with the drawings, wherein:—

Figure 1 is an elevation of a pair of cutting rolls properly mounted upon a frame and showing driving connections for rotating the rolls in a proper relative direction for shearing the strips from a continuously moving sheet of prepared roofing material.

Fig. 2 is a developed plan view of a part of one of the rolls.

Fig. 3 is an enlarged plan view showing part of the shearing knives and the manner of securing them to the face of the rolls.

In all the views the same reference characters are employed to indicate similar parts.

5 is a part of a frame of the machine, having a floor 6 and provided with housings 7 and 8. 9 is one of the shearing rolls and 10 is the coöperating shearing roll driven in proper direction, as shown by the arrows, by the intermediate train of gearing 12. Either of the rolls is provided with shearing knives 13 and 14, as more clearly shown in Fig. 3.

It will be observed that the row 15 of knives is practically the same as the row 17, and that the rows 18 and 19 are substantial duplicates, the only difference being that the rows 18 and 19 are longitudinally displaced upon the rolls with reference to the rows 15 and 17, so that the projections 20 of each adjacent row are in the same transverse plane. The rows of knives on roll 9 are substantially the same as the rows of knives on roll 10 and so arranged that the shearing edges of the respective knives meet when the peripheries of the two rolls come nearest together.

21 is a constantly moving sheet of roofing fabric or material driven in proper time relation with the shearing rolls 9 and 10 by the feed rolls 22 and 23.

The strips cut by the revolving rolls are substantially of the configuration of the spaces 24 and 25 between adjacent rows of shearing knives. It is assumed that the sheet 21 is of uniform width, which is equal to the length of the rolls 9 and 10, in which event the strips cut by the rows of knives 15—19 will resemble the interspaces 24 and 25, respectively. In the former the left hand transverse joining edge 26 is relatively short while the transverse edge 27 is relatively long. The strip 25 has its ends reversed, with reference to strip 24, the shorter end 26 being at the right hand side of the rolls, while the longer edge 27 is at the left hand side.

If the strips and the rolls were terminated, as at the dotted line 28, then a strip would be made having two shorter end edges 26 and another strip with two longer edges 27, in alternate relation, as the rolls are rotated. In this event the alternate strips would not be duplicates of each other, but the rolls would produce two types of strips, one having narrow end edges 26 and the other having relatively wider edges 27, in alternate relation.

Any proper manner of preventing back lash of the rolls, and to cause the knives to properly register, as they are rotated toward each other, may be employed for the purpose.

The gist of my invention consists in producing a pair of rolls which will shear from a constantly moving sheet, strips requiring shearing knives of practically the same general configuration, or characteristic for their upper and lower edges, but longitudinally displaced so that the strips may be sheared from a continuously moving sheet without the necessity of axially displacing the rolls or shifting the sheet in a sidewise direction.

It is, of course, manifest that the general shape of the shearing blades 13 and 14 may be somewhat different from those shown, and suitable sets of rows of sharp knives may be used, on only one roller, the companion roller being blank or devoid of knives, the shearing operation being accomplished by pressing the fabric, by the knives of one roll into firm contact with the other roll until the edge of the knives are brought into substantial contact with the opposing roll, without departing from the spirit and scope of my invention.

Having described my invention, what I claim is:—

1. A machine for shearing strips comprising two parallel rotatable rolls having their peripheries separated a distance sufficient to contain a strip to be sheared therebetween coacting sets of like shearing knives arranged in zig-zag fashion in a general axial direction of said rolls, on each roll, having connecting base flanges on one side only to secure them to the rolls, and having cutting edges on the opposite sides from said flanges arranged for shearing interposed material; means for rotating the rolls and means for continuously feeding the strip to the rolls.

2. A mechanism of the character described including in combination a pair of rotatable rolls arranged in parallel relation to each other, each roll having provided thereon a plurality of sets of like shearing knives arranged to coöperate to shear the material passing between the rolls, said knives being zigzag in formation and arranged in pairs at spaced intervals around the rolls, the knives of each pair being arranged in opposition to each other so that the respective projections and indentations thereof are in peripheral alinement, and therefore the sheared strip of material is cut with a plurality of projections and indentations on each side thereof, said projections being in transverse alinement with each other and said indentations being in transverse alinement with each other.

In testimony whereof I hereunto set my hand in the presence of two subscribing witnesses.

OTTO A. HEPPES.

In the presence of—
MARY F. ALLEN,
FORÉE BAIN.